(12) United States Patent
Hon

(10) Patent No.: US 9,968,132 B2
(45) Date of Patent: May 15, 2018

(54) ELECTRONIC CIGARETTE WITH CAPACITOR SENSOR

(71) Applicant: FONTEM HOLDINGS 1 B.V., Amsterdam (NL)

(72) Inventor: Lik Hon, North Point (HK)

(73) Assignee: FONTEM HOLDINGS 1 B.V., Amsterdam (NL)

( * ) Notice: Subject to any disclaimer, the term of this patent is extended or adjusted under 35 U.S.C. 154(b) by 790 days.

(21) Appl. No.: 14/172,426

(22) Filed: Feb. 4, 2014

(65) Prior Publication Data
US 2014/0150810 A1 Jun. 5, 2014

Related U.S. Application Data

(63) Continuation of application No. PCT/CN2011/001284, filed on Aug. 4, 2011.

(51) Int. Cl.
| | | |
|---|---|---|
| A24F 47/00 | (2006.01) | |
| H04R 1/02 | (2006.01) | |
| G01L 9/00 | (2006.01) | |
| G01L 19/06 | (2006.01) | |

(52) U.S. Cl.
CPC ........... *A24F 47/008* (2013.01); *H04R 1/028* (2013.01); *G01L 9/0072* (2013.01); *G01L 19/0627* (2013.01); *H04R 2410/00* (2013.01)

(58) Field of Classification Search
None
See application file for complete search history.

(56) References Cited

U.S. PATENT DOCUMENTS

| | | |
|---|---|---|
| 5,561,247 A | 10/1996 | Mutoh |
| 5,894,841 A | 4/1999 | Voges |
| 6,718,827 B1 | 4/2004 | Lee et al. |
| 2002/0123669 A1* | 9/2002 | Wickstrom ....... A61M 15/0065 600/235 |
| 2004/0089314 A1 | 5/2004 | Felter |

(Continued)

FOREIGN PATENT DOCUMENTS

| | | |
|---|---|---|
| CN | 101084801 A | 12/2007 |
| EP | 2319334 A1 | 5/2011 |

(Continued)

OTHER PUBLICATIONS

The State Intellectual Property Office (China), First Office Action issued in CN Patent Application No. 201180073754.4 (PCT/CN2011/001284) dated Feb. 28, 2015.

(Continued)

*Primary Examiner* — Michael H Wilson
*Assistant Examiner* — Katherine Will
(74) *Attorney, Agent, or Firm* — Perkins Coie LLP; Kenneth H. Ohriner

(57) ABSTRACT

An electronic cigarette, cigar or pipe has a capacitor sensor includings a first conductive plate and a second conductive plate configured to form a capacitor circuit. An output of the capacitor sensor is based at least in part on the capacitance of the capacitor circuit. A pressure sensitive component is connected to the first conductive plate and configured to move the first conductive plate based on a pressure differential between two sides of the pressure sensitive component to change a capacitance of the capacitor circuit.

18 Claims, 15 Drawing Sheets

(56) References Cited

U.S. PATENT DOCUMENTS

| | | |
|---|---|---|
| 2006/0196518 A1 | 9/2006 | Hon |
| 2007/0074734 A1 | 4/2007 | Braunshteyn |
| 2011/0094523 A1* | 4/2011 | Thorens ................ A24F 47/008 |
| | | 131/194 |

FOREIGN PATENT DOCUMENTS

| | | |
|---|---|---|
| JP | H06288851 A | 10/1994 |
| JP | H095191 A | 1/1997 |
| WO | 2004080216 | 9/2004 |
| WO | 20110033396 A2 | 3/2011 |

OTHER PUBLICATIONS

European Patent Office, extended European search report in EP Patent Application No. 11870423.8 dated Jun. 29, 2015.
European Patent Office, Extended European Search Report issued in EP Application No. 16151721.4 (dated Aug. 29, 2016).
European Patent Office , "Official Action (Article 94(3) EPC", for EP16151721.4, dated Sep. 26, 2017, 11 pgs.
State Intellectual Property Office PRC China, Office Action, with translation, dated Sep. 16, 2015, 9 pages.
State Intellectual Property Office PRC China, International Search Report and Written Opinion for PCT/CN2011/001284, dated May 3, 2012, 5 pgs.

* cited by examiner

ELECTRONIC CIGARETTE WITH CAPACITOR SENSOR

CROSS-REFERENCE TO RELATED APPLICATIONS

This application is a continuation of International Application No. PCT/CN2011/001284, filed Aug. 4, 2011 and designating the U.S., which is incorporated herein by reference.

TECHNICAL FIELD

The present disclosure is generally related to an electronic cigarette, cigar or pipe having a capacitor sensor for measuring changes in capacitance, a device employing the capacitor sensor and a method for operating the device.

BACKGROUND

Capacitor sensors and optical sensors may be employed as an alternative to mechanical sensors for higher sensitivity. A conventional capacitor sensor includes a permanently charged membrane which forms a capacitor with a metal plate. This type of sensor is vulnerable to humidity, moisture, liquid leakage, dirt or other environmental factors which can cause a fault by shorting out and discharging the two sides of the membrane. In addition, to permanently charge the membrane, a voltage of around 10,000 V needs to be applied to the membrane, making such a sensor costly and difficult to manufacture and unsuitable for many applications.

SUMMARY OF THE INVENTION

A capacitor sensor is provided in an electronic cigarette, cigar or pipe. The capacitor sensor includes a first conductive plate; and a second conductive plate, wherein the first conductive plate and the second conductive plate are configured to form a capacitor circuit having a capacitance; and a pressure sensitive component connected to the first conductive plate and configured to move the first conductive plate based on a pressure differential, so as to change the capacitance of the capacitor circuit. In one aspect, the first conductive plate is movable and the second conductive plate is stationary.

In an alternative embodiment, the second conductive plate of the capacitor sensor described above comprises a first conductive surface and a second conductive surface forming a first capacitor, the first conductive surface forms a second capacitor with the first conductive plate, and the second conductive surface forms a third capacitor with the first conductive plate. The output of the capacitor sensor is provided based on the first, second and third capacitors described above.

DETAILED DESCRIPTION

Figure 1:
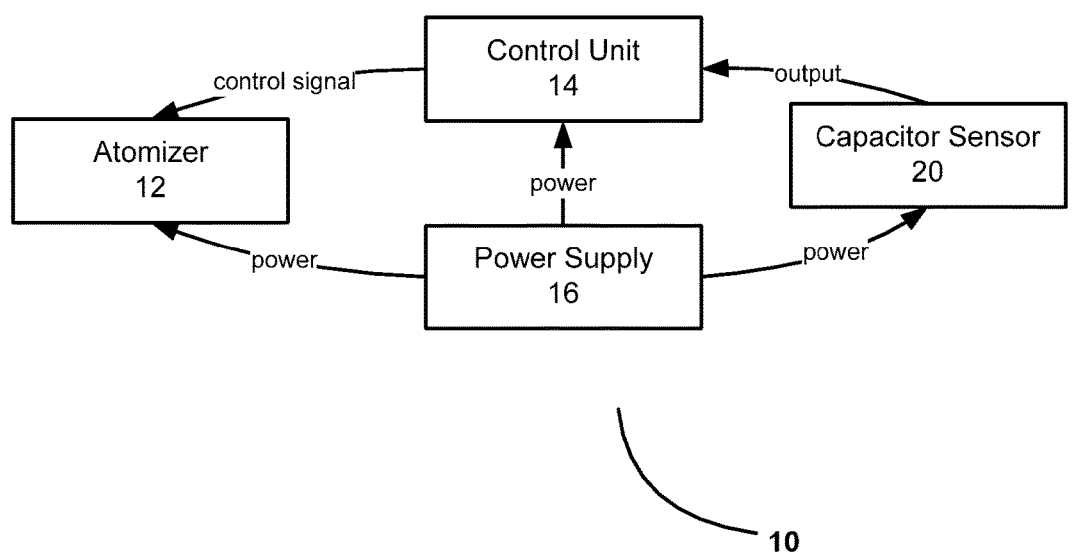
FIG. 1 is a block flow diagram illustrating a circuit in an electronic cigarette.

The following description provides details for a thorough understanding of, and enabling description for, various examples of the technology. One skilled in the art will understand that the technology may be practiced without all of the details described herein. In some instances, known structures and functions have not been shown or described in detail to avoid unnecessarily obscuring the description of the examples of the technology.

It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Capacitor sensors for measuring changes in capacitance, devices employing the capacitor sensor and methods for operating the device are provided herein. As will be appreciated by the embodiments described below, the capacitor sensors described herein may be employed by any suitable electronic device including, but not limited to, electronic smoking devices (e.g., electronic cigarettes, electronic cigars, electronic pipes, electronic water pipes and any other suitable cigarette substitutes).

A capacitor sensor generally detects and converts pressure changes into electronic parameters, such as a capacitance or a change in capacitance as shown by the sensor. A change in capacitance of the sensor may trigger an output signal that is sent to or detected by one or more associated components in an electronic device such as those described above. As a consequence, the electronic devices that use such a capacitor sensor may operate based on its output signal.

In one embodiment, the electronic device may be an electronic smoking device, such as an electronic cigarette, which includes a capacitor sensor and a control unit coupled to the capacitor sensor. The control unit (or "controller") receives and operates based on, at least in part, the output of the capacitor sensor. When the control unit receives an output signal from the capacitor sensor, the control unit may then send another output signal to another associated component to activate or inactivate said component. In one embodiment, an associated component that receives a controller output signal may be an atomizer. The atomizer may include a heating element for vaporizing a nicotine solution upon inhalation by a user. In this case, the atomizer also acts as a vaporizer. Alternatively, the atomizer may be a separate component from the heating element, causing the nicotine solution to be vaporized independently from the atomizer. The term "atomizer" and "atomization" includes both types of atomizers: those that include a heating element and act as a vaporizer, and those that have a separate heating element for vaporizing a solution as described above.

Turning now to the drawings, FIG. 1 is a block flow diagram illustrating an electronic circuit 10 that may be found in an electronic device, such as an electronic cigarette, according to one embodiment. A power supply 16, such as a battery, may be used as a source of energy for the circuit 10. A control unit 14 may be configured to control an atomizer 12, based on an output signal of a capacitor sensor 20. In one embodiment, a second signal may be sent to the atomizer by the control unit as a response to the signal output from the capacitance sensor to start or stop an atomization or vaporization process. In some aspects, when a user inhales from an air outlet or mouthpiece (not shown) on the electronic smoking device, a pressure differential resulting from the inhalation may be detected by the capacitor sensor 20 as a change in capacitance, which then triggers the output signal sent to the control unit. Consequently, the control unit 14 activates or turns on the atomizer 12 by a control second signal to atomize or vaporize a solution (e.g., nicotine solution) stored within the electronic smoking device. Alternatively, an electronic smoking device may have one or more electric circuits that differ from the one shown in FIG. 1. For example, the capacitor sensor 20 may send an output signal directly to the atomizer (not shown). Further, additional components may be present in the electronic smoking device including, but not limited to, a display screen for monitoring usage, a rechargeable component, an additional control unit or a circuit board, a vaporization component, a heating component, a pump component and an LED component.

In another embodiment, the capacitor sensor 20 may be configured to provide variable output signals that correlate with the depth of a user's inhalation (e.g., the deeper the inhalation, the greater the output signal, and vice versa). The variable output signals result in a corresponding atomization level by the atomizer 12, so as to simulate a regular cigarette.

Figure 2:
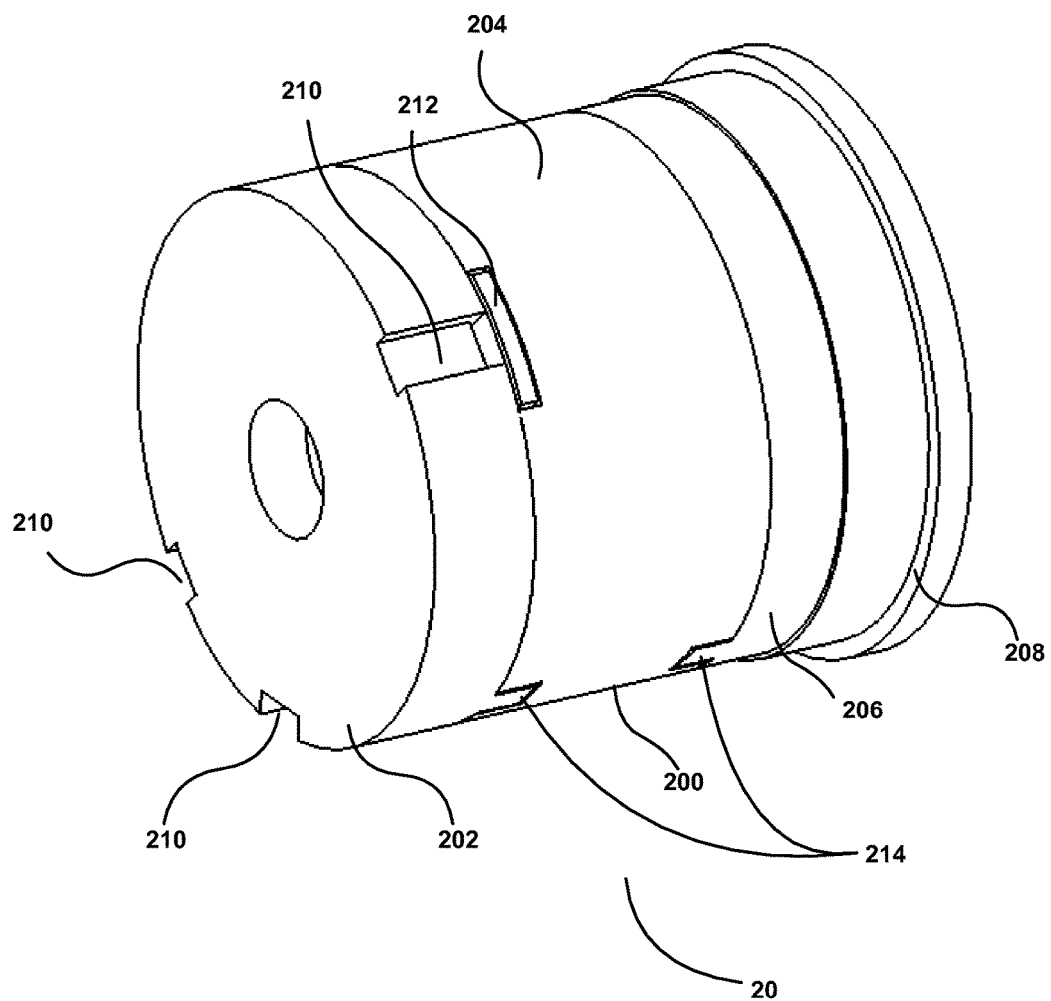
FIG. 2 is a perspective view of a capacitor sensor.

FIG. 2 is an external perspective view of a capacitor sensor 20 according to an embodiment of the disclosure. The capacitor sensor 20 comprises a shell 200 and components or elements (not shown) contained within and/or protected by the shell 200. Openings 212 may be formed to allow wires or other suitable connectors (not shown) to extend from of the shell 200 for connections to other components within the circuit (e.g., to the control unit 14 and the power supply 16). Grooves 210 may be formed on an external wall of the shell 200 to receive the wires extending from the openings 212, such that it is not necessary to enlarge a radial dimension of the electronic cigarette to accommodate the wires within the body of the electronic smoking device. The grooves 210 may extend through one or more pieces of the shell 200. The shell 200 may include a cover piece 202. The cover piece 202 may be configured to protect the internal components or elements inside the shell 200 against damage.

The shell 200 further comprises a base piece 204, an air damping piece 206 and a connection piece 208. The base piece 204 may be configured to hold the elements inside the capacitor sensor 20, which will be further described below with reference to FIGS. 3a-3c. In an embodiment, the base piece 204 is connected to the cover piece 202 and the air damping piece 206 by interlocking connections, wherein the interlocking connections 214 may be strengthened by glue or any other suitable adhesive material. In another embodiment, the air damping piece 206 is connected to the connection piece 208 via a screw 305a or other suitable fastening element as shown in FIGS. 3a-3c.

In some embodiments, the cover piece 202, the base piece 204 and the air damping piece 206 may be made from any suitable plastic material including, but not limited to, polyethylene, high-density polyethylene, low-density polyethylene, polypropylene, polystyrene, high impact polystyrene, polyvinyl chloride, polyvinylidene chloride, polytetrafluoroethylene, polyamide, rubber, bioplastics, polyester, polyethylene terephthalate, acrylonitrile butadiene styrene, polycarbonate and polyurethane. In other embodiments, the connection piece 208 may be made from any suitable electrically conductive material (e.g., copper, silver, aluminum, gold, graphite, salts, conductive polymers, steel and plasma) or may be made from a suitable non-conductive material such as plastic.

Figure 3A:
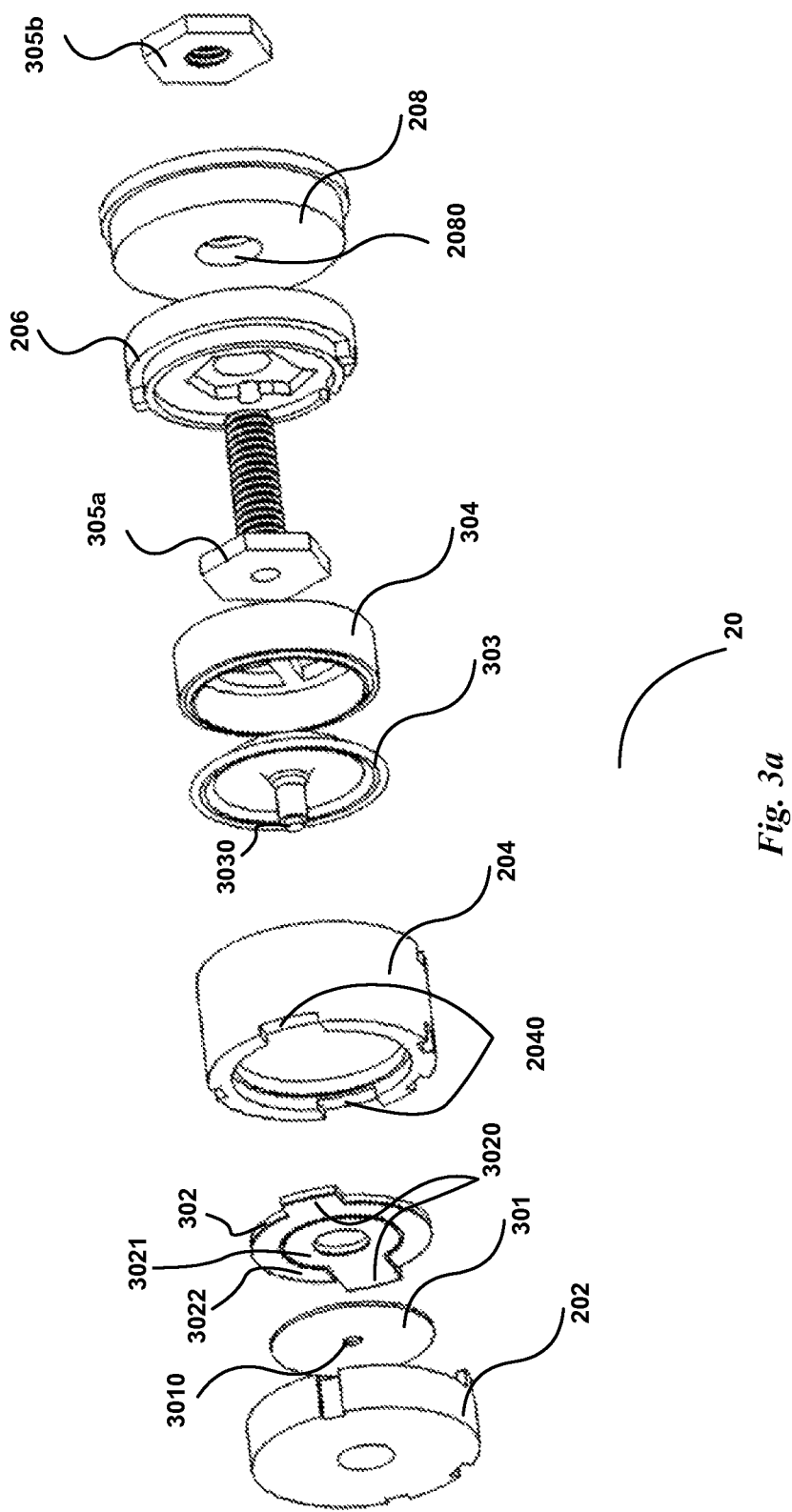
FIGS. 3a-3c are exploded views of the capacitor sensor 2 shown in FIG. 2.
Figure 3B:
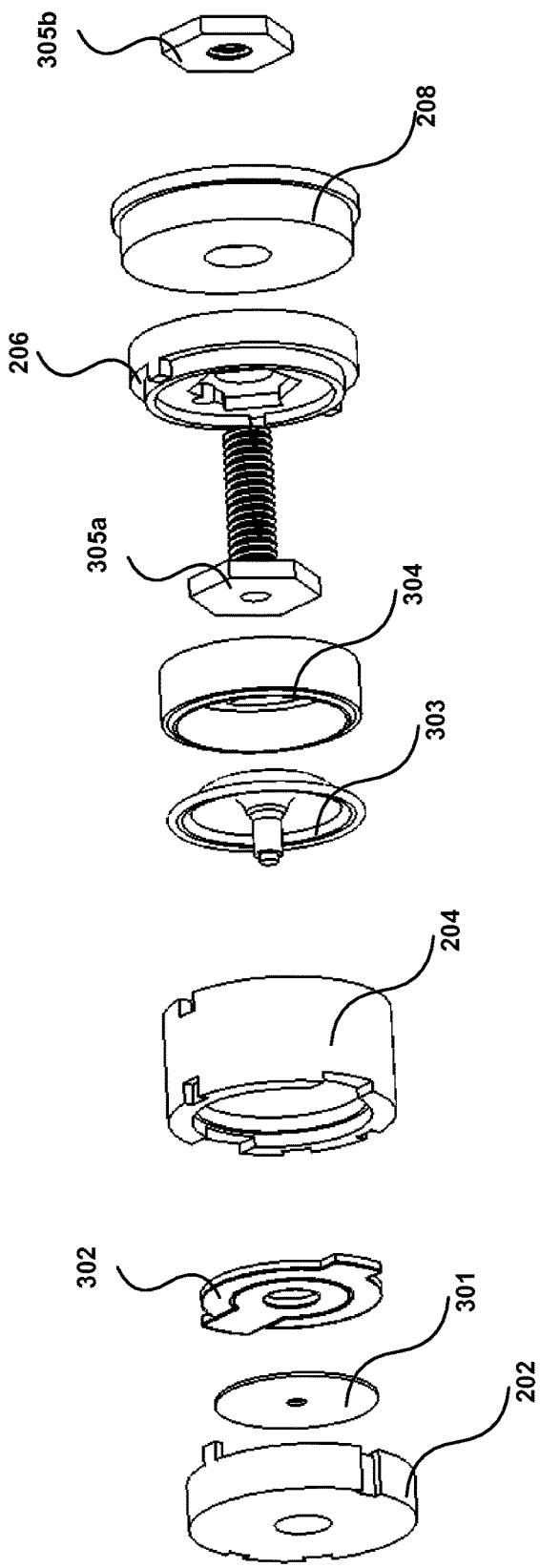
Figure 3C:
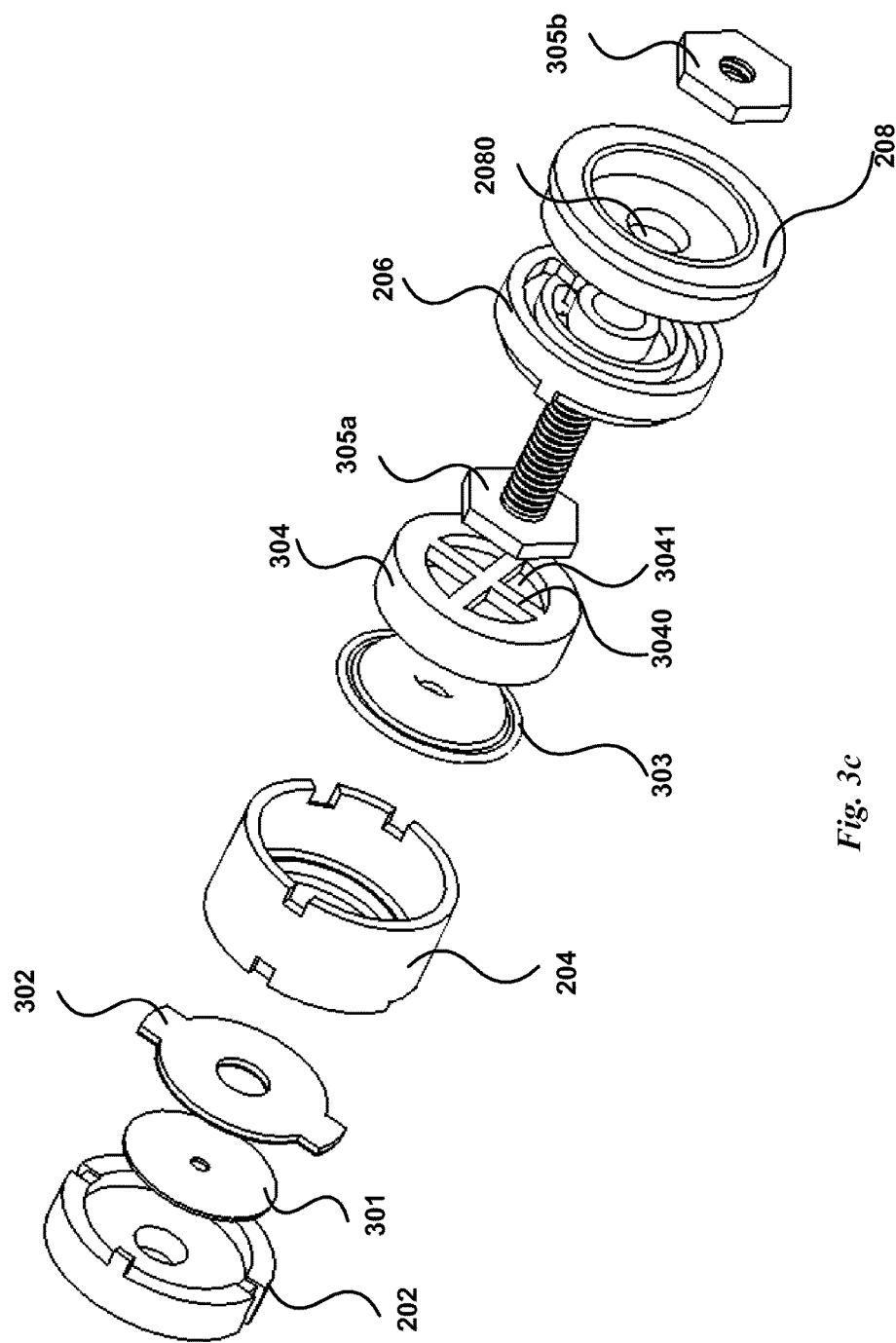

As shown in FIGS. 3a-3c, the capacitor sensor may include a first conductive plate 301 (or "movable plate") according to some embodiments. In one aspect the first conductive plate 301 is movable, as described in detail below. The first conductive plate 301 may be made of aluminium, copper, gold, silver or any other material suitable for a capacitor such as a plane-parallel capacitor. A central hole 3010 may be formed on the first conductive plate 301 and used for connections to other components of the capacitor, such as the central protrusion 3030 of the pressure sensitive component, which is described further below.

The capacitor sensor of this embodiment also includes a second conductive plate 302, which comprises a first conductive surface 3021 which is surrounded by a second conductive surface 3022. In one aspect, the second conductive plate 302 is stationary or stable. A space is established between the first 3021 and second 3022 conductive surfaces such that the two surfaces on the second conductive plate 302 form a first capacitor.

The capacitance (C) of a capacitor having two conductive plates or surfaces is determined by equation (1):

$$C = \frac{\varepsilon S}{d} \quad (1)$$

where $\varepsilon$ is the permittivity of the medium such as air between the two conductive plates or surfaces, S is the surface area of the overlapping portions of the two conductive plates or surfaces, and d is the distance between the two conductive plates or surfaces.

Therefore, by configuring d and the diameters of the first and second conductive surfaces 3021 and 3022, the capacitance of the first capacitor ($c_1$) may be limited to a small or negligible capacitance as needed. Further, because the first and second conductive surfaces are part of a single second conductive plate, the first capacitor is inherent (or "fixed").

In addition, the first conductive plate 3010 forms a second capacitor with the first conductive surface 3021 of the second conductive plate 302 having a capacitance of $c_2$. The first conductive plate 3010 also forms a third capacitor with the second conductive surface 3022 of the second conductive plate 302 having a capacitance of $c_3$.

Figure 4:
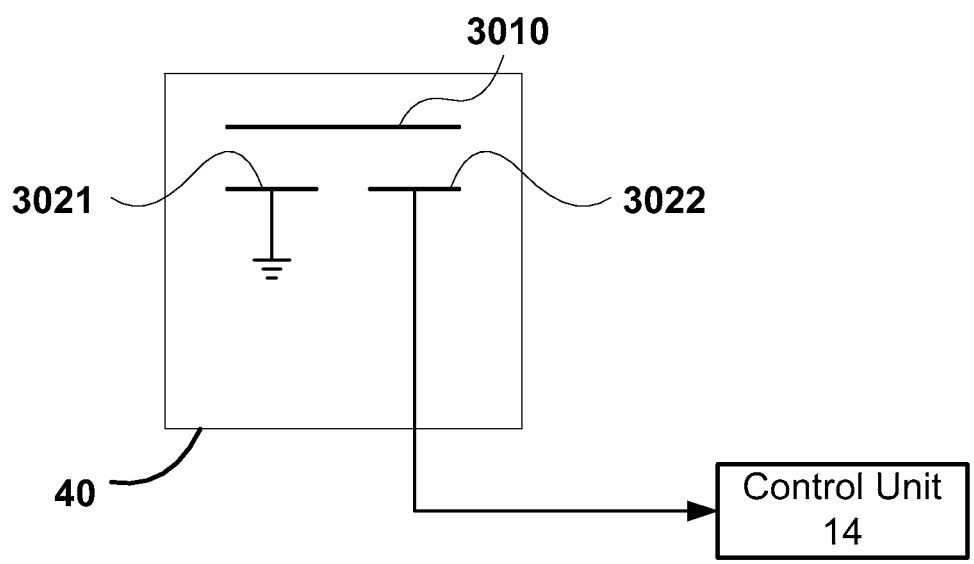
FIG. 4 is a drawing illustrating a capacitor circuit 4 in the capacitor 20 shown in FIG. 2.

In some embodiments, a combination of the first, second and third capacitors may be illustrated as a capacitor circuit 40 in FIG. 4. In one aspect, the first conductive surface 3021 is grounded and the second conductive surface 3022 is coupled to the control unit 14 such that the control unit 14 receives an output signal of the capacitor sensor 20. In an alternative aspect, the first conductive surface 3021 may be connected to the control unit 14 and the second conductive surface 3022 may be grounded. In one embodiment, the control unit 14 will charge the second conductive surface 3022 to detect any change in the capacitance of the capacitor circuit 40. Alternatively, the capacitor circuit 40 may be charged in any other suitable method known in the art.

As discussed briefly above, the size and distance between the first and second conductive surfaces 3021 and 3022 such that the inherent capacitance of $c_1$ within the capacitor circuit 40, may be negligible as compared to $c_2$ and $c_3$. That makes the change in capacitance of the capacitor 40 easier to detect. Detection and calculation of changes in capacitance in the capacitor circuit 40 will be described further below.

Figure 6:
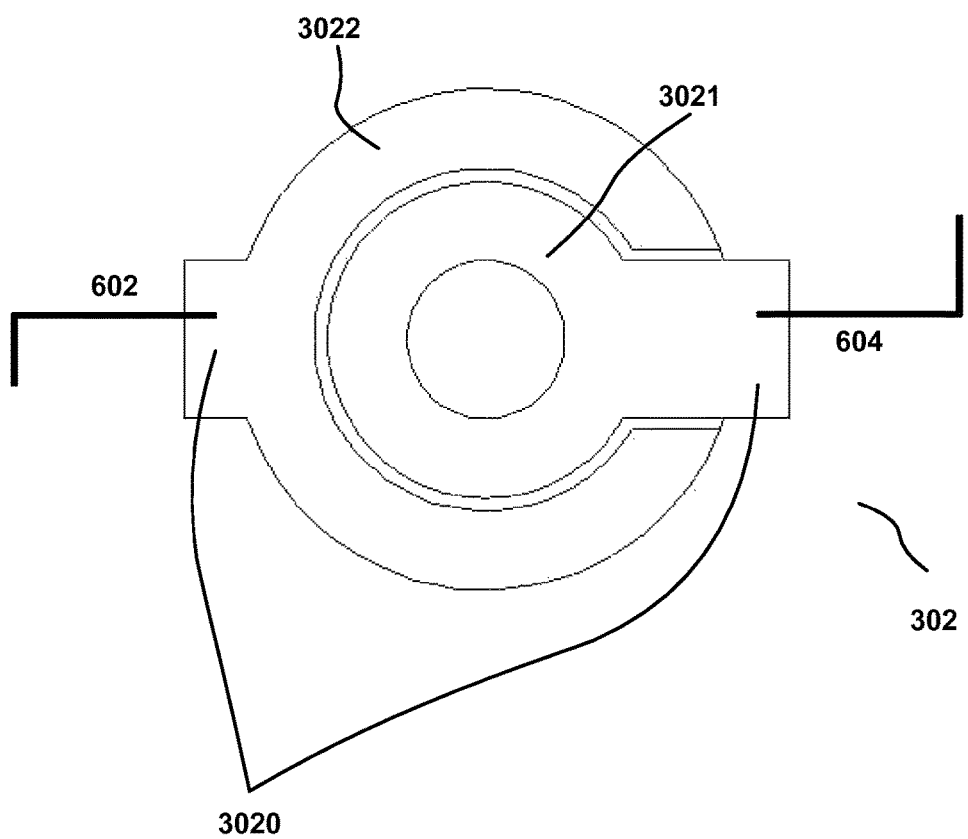
FIG. 6 is a front view of the second conductive plate 302 shown in FIGS. 3a-3c.

Referring to FIG. 3a and FIG. 6, the second conductive plate 302 is provided with two lugs 3020, which match two supporting grooves 2040 formed on the base piece 204 of the shell 200. By placing the lugs 3020 in the grooves 2040, the second conductive plate 302 will not rotate with respect to other components. In one aspect, the cover piece 202 is further configured to press the second conductive plate 302 against the base piece 304, so as to eventually fix the second conductive plate 302 to the shell 200. In one embodiment, the lugs 3020 belong to the first and second conductive surfaces 3021 and 3022, respectfully. The first conductive surface 3021 may be wired at the lug 3020 and the second conductive surface 3022 may be wired at the lug 3020. In one embodiment, the first conductive surface 3021 is connected to a first wire 604 and the second conductive surface 3022 is connected to a second wire 602.

Figure 5A:
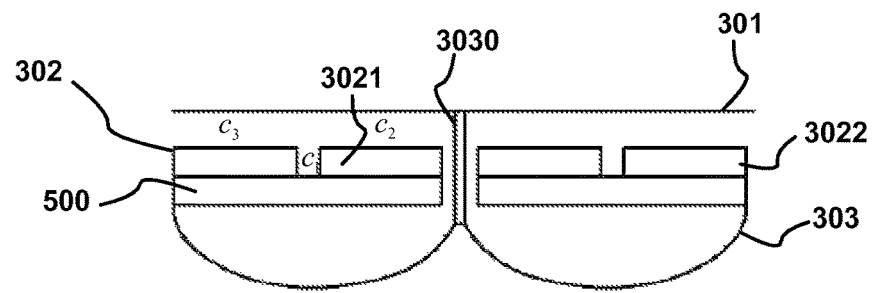
FIG. 5a is a cross sectional view of a part of the capacitor sensor 2 shown in FIG. 2.
Figure 5B:
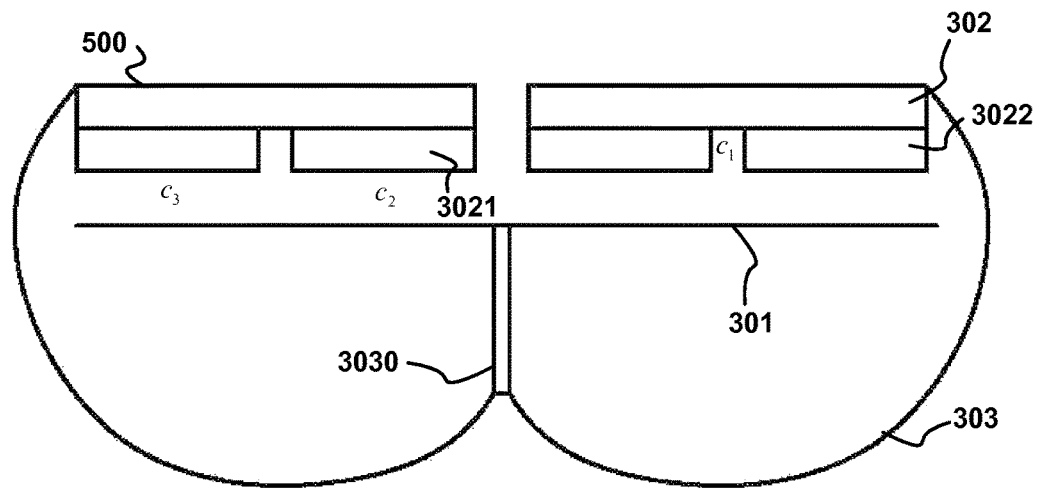
FIG. 5b is a cross sectional view of a part of a capacitor sensor 2.
Figure 7:
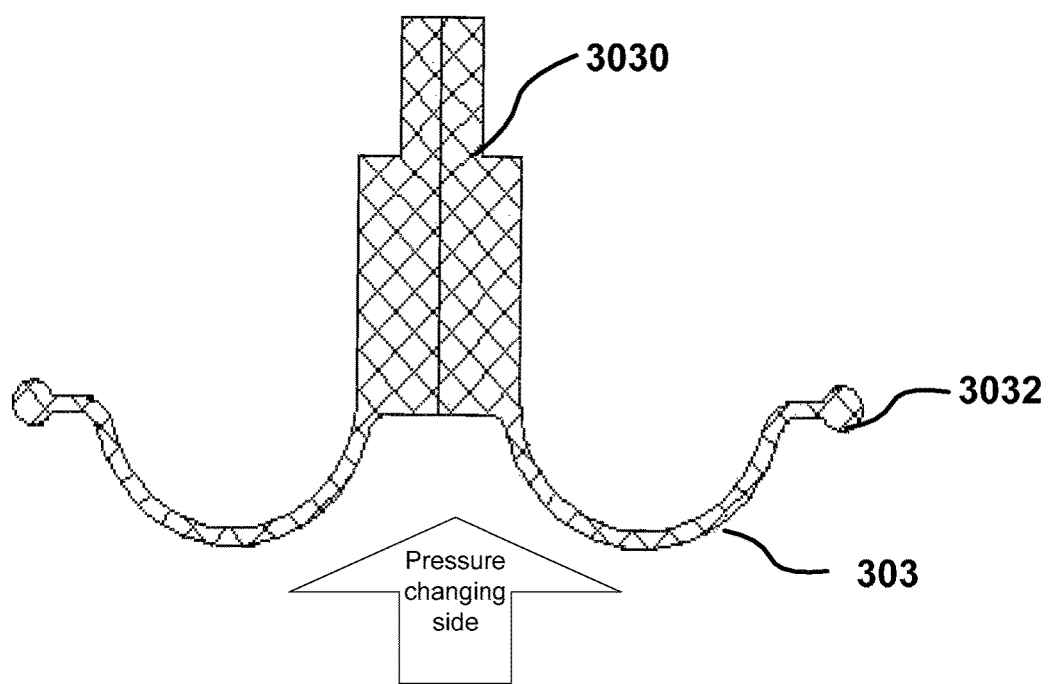
FIG. 7 is a lengthwise sectional view of the corrugated membrane 303 shown in FIGS. 3a-3c.

According to some embodiments, the capacitor sensor detects pressure changes using a pressure sensor system. The pressure sensor system may include a pressure sensitive component 303, which may be formed by a pressure sensitive membrane, such as a membrane as shown in FIGS. 5a-5b and 7 ("membrane"). In one embodiment, a central protrusion 3030 is formed at a center of the membrane 303 and extends through a central hole on the second conductive plate 302 to the first conductive plate 301. The central protrusion 3030 may be inserted into a through hole 3010 and fixed to the first conductive plate 301 by any suitable adhesive or glue. In one aspect, fixing the first conductive plate 301 may be fixed to the membrane 303 by using a quick-drying adhesive, and subsequently securing the connection using a strong glue or adhesive.

In some embodiments, a user may inhale from a mouthpiece end of an electronic smoking device, which generates a pressure differential. The pressure differential is generated by establishing a relative negative pressure on one side of the pressure sensitive membrane 303 ("the negative pressure side"). In one aspect, the negative pressure side of the pressure sensitive membrane is illustrated as the right side of the pressure sensitive membrane as shown in FIG. 3a. Because the membrane 303 is airtight or substantially airtight between its two sides, the membrane 303 deforms toward the negative pressure side, drawing the first conductive plate 301 towards the second conductive plate 302. Thus, referring to equation (1), $c_2$ and $c_3$ increase due to a decrease in the distance between the conductive plates of the second and third capacitors, resulting in an increase in the capacitance of the capacitor circuit 40 which may be detected by the control unit 40. In one embodiment, the control unit 14 compares this increase with a threshold capacitance value. If the increase in capacitance of the capacitor circuit exceeds the threshold capacitance value, the atomizer 12 will be switched on.

As discussed above, FIG. 4 illustrates a capacitor circuit 40 that that includes the second and third capacitors connected in series. Because the first capacitor may be configured to have a negligible capacitance as compared to the second and third capacitor, $c_1$ has been omitted from the capacitance calculation of the capacitor circuit. The total capacitance c of the capacitor circuit, is therefore determined by equation (2):

$$c = \frac{c_2 c_3}{c_2 + c_3} \quad (2)$$

Therefore, an increase in the capacitance of the capacitor circuit 40 is determined by equation (3):

$$\Delta c = \frac{c'_2 c'_3}{c'_2 + c'_3} - \frac{c_2 c_3}{c_2 + c_3} \quad (3)$$

By substituting equation (1) into equation (3), and an effective area between the first conductive surface 3021 and the first conductive plate 301 is equal to an effective area between the second conductive surface 3022 and the first conductive plate 301, the expression of $\Delta c$ can be simplified as equation (4):

$$\Delta c = 0.5 \Delta c_2 \text{ or } \Delta c = 0.5 \Delta c_3 \quad (4)$$

where $\Delta c_2$ is equal to $\Delta c_3$ in this embodiment. As described above, $c_2$ and $c_3$ are much larger than $c_1$, therefore, $\Delta c$ is considerably higher than $c_1$ and will be detected by the control unit 14.

FIG. 5a shows a cross sectional view of a pressure sensor system of a capacitor sensor 20 according to some embodiments, wherein the second conductive plate 302 further comprises a base 500 and the first and second conductive surface 3021 and 3022 are mounted on the base 500. As seen in FIG. 5a, a section of the pressure sensitive membrane 303 has a "w" or "m" shape and the base of the central protrusion 3030 extends from a central vertex on the "w" or "m". As described above, the top of the central protrusion 3030 is fixed to the hole in the first conductive plate 30. Also illustrated in FIG. 5a is the capacitance between the first, second and third capacitors ($c_1$, $c_2$ and $c_3$, respectively). When a user inhales, the membrane 303 deforms because of a pressure differential generated between two sides of the membrane 303 as discussed above. Deformation of the membrane results in a decrease in the distance between the first conductive plate 301 and either of the first or second conductive surfaces 3021 and 3022 of the second conductive plate. Accordingly, the control unit 14 detects an increase in the capacitance of the capacitor circuit 40.

FIG. 5b shows a cross sectional view of a pressure sensor system according to another embodiment. In this embodiment, the distance between the first conductive plate 301 and the first and second conductive surfaces 3021 and 3022 is increased upon generation of negative pressure and deformation of the pressure sensitive membrane 303 as a result of inhalation by the user. Accordingly, the control unit 14 may detect a decrease in capacitance of the capacitor circuit 40.

Referring to FIG. 3a and FIG. 7, the membrane 303 is made airtight by securing or sealing the outer edge 3032 of the membrane 303 between the base piece 204 and a stopper 304. In some embodiments, the stopper 304 allows airflow to pass and is configured to limit the deformation of the membrane 303. In one embodiment, referring to FIG. 3c, a cross 3040 is formed on the stopper 304, forming four air paths 3041 through which airflow in the capacitor sensor causes a pressure change against the pressure changing side of the membrane 303. In one embodiment, the stopper 304 and the base piece 204 are shaped such that the stopper 304 is securely fastened in the base piece 204 by frictional forces between an outer wall of the stopper 304 and an internal wall of the base piece 204. As shown in FIG. 7, the outer edge 3032 of the pressure sensitive membrane 303 may be shaped such that the pressure sensitive membrane 303 may be securely fixed by clamping or otherwise fastening the base piece 204 to the stopper 304. In this case, air is prevented from passing through one side of the membrane 303 to the other.

Figure 8A:
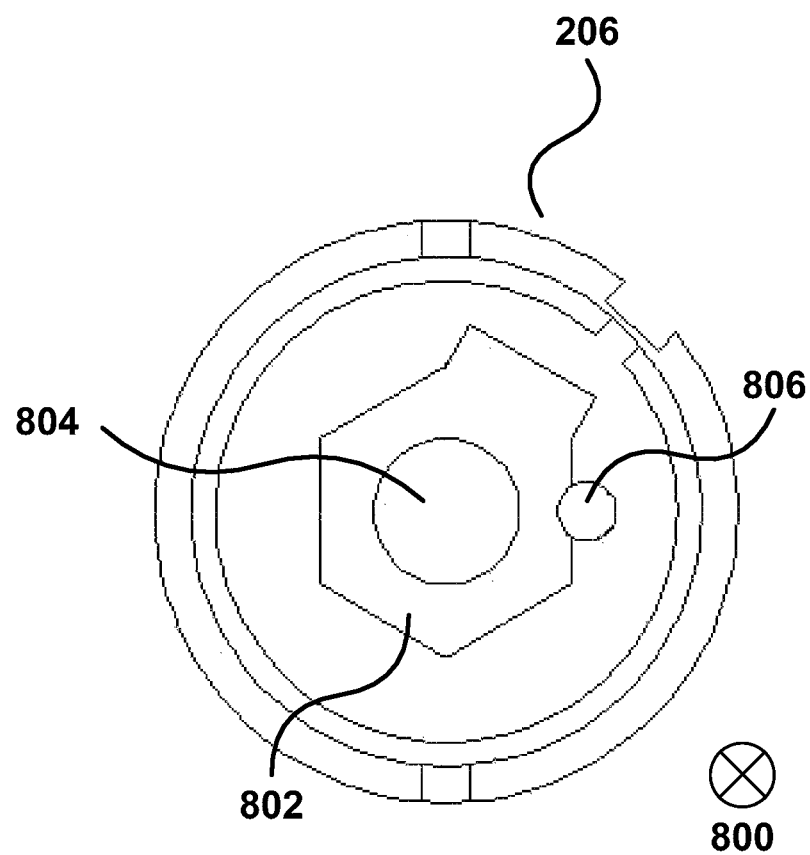
FIG. 8a is a front view of an air damping piece 206 shown in FIGS. 3a-3c.
Figure 8B:
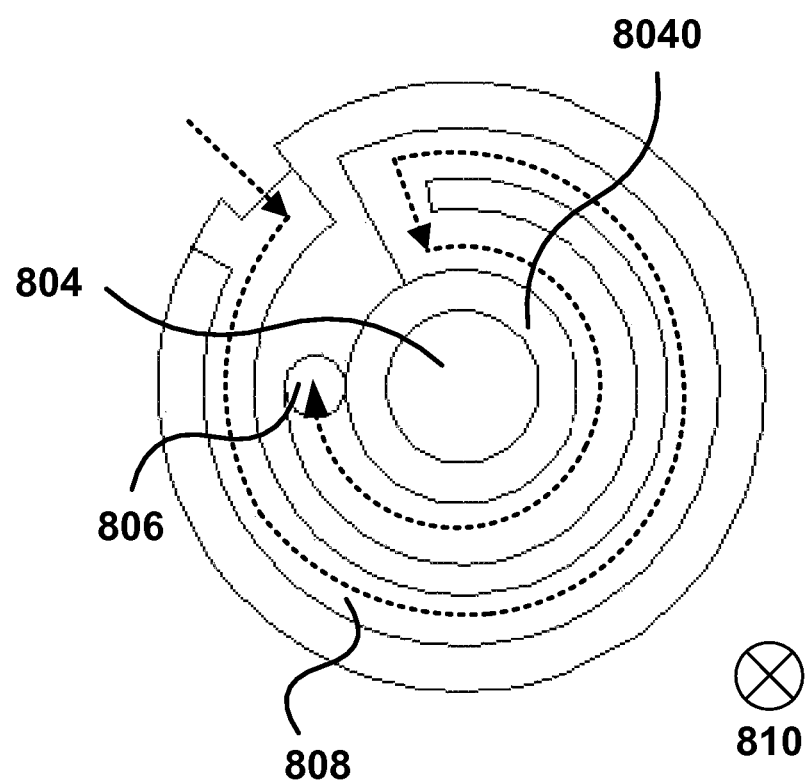
FIG. 8b is a back view of the air damping piece 206 shown in FIGS. 3a-3c.
Figure 8C:
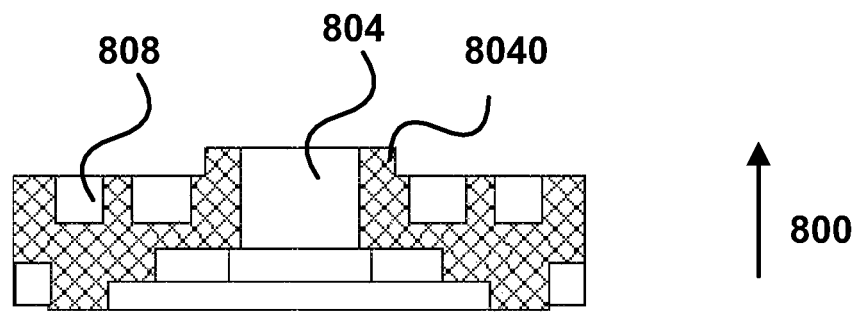
FIG. 8c is a cross sectional view of the air damping piece 206 shown in FIGS. 3a-3c.

FIG. 8a is a front view of an air damping piece 206 shown in FIGS. 3a-3c. FIG. 8b is a back view of the air damping piece 206 and FIG. 8c is a lengthwise sectional view of the air damping piece 206. According to some embodiments, a cavity is formed between the negative pressure side of the pressure sensitive membrane 303 and the air damping piece 206. When a user inhales, air is drawn out through the through hole 804 in direction 800 and a pressure change (e.g., a relative negative pressure) is generated in the cavity. Under the ambient air pressure, new air enters the cigarette via one or more air inlets on an electronic smoking device. However, the inflow may be damped by an air damping channel 808. In other words, the inflow of air to offset of the pressure differential generated by the inhalation is delayed by the air damping channel 808. The deeper the user inhales, the more air is needed to offset the pressure differential, and the longer the offset takes, thereby prolonging the atomization time. On the other hand, the more shallow the inhalation, the less air is needed to offset the pressure differential, and the shorter the offset takes, thereby shortening the atomization time.

The damping effect or delay described above prolongs the atomization time because the change in capacitance resulting from the negative pressure generated by inhalation continues to send an output signal to the control unit until the pressure differential has been offset by the inflow of air as described above. The inflow air pathway is indicated by the dotted line in FIG. 8b and enters the cavity through a hole 806 in direction 810.

In various embodiments, the air damping channel 808 can extend, in a cross section of the capacitor sensor 20, on an outer wall of the shell 200 or various portions of both such that a part of the channel is on the outer wall of the shell 200 or in a cross section of the capacitor sensor 20.

In some embodiments, an outer edge 8040 of a first through hole 804 fits and can be inserted into a second through hole 2080 on the connection piece 208. Accordingly, outflow will be mainly through the hollow screw 305a. The screw 305a extends out of the second through hole 2080 and the nut 305b may be used to secure the screw 305a so as to couple the air damping piece 206 to the connection piece 208. In one embodiment, one or more electronic connectors may be electrically connected to the connection piece 208 to establish electrical connections in the cigarette.

Figure 9:
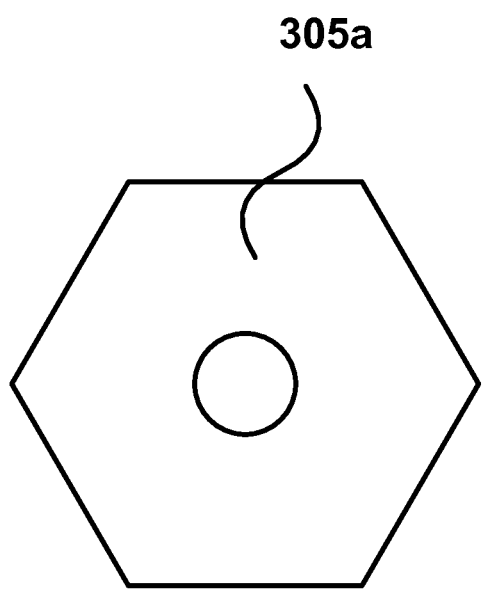
FIG. 9 is a top view of the screw 305a shown in FIGS. 3a-3c.

FIG. 9 shows a top view of the screw 305a in FIGS. 3a-3c. As illustrated, the screw 305a is hollow and hence allows air to flow through its center and out of the electronic smoking device upon inhalation by a user. In some embodiments, when a user inhales, air is drawn from the cavity through this hollow screw 305a so as to lower the pressure at the pressure changing side of the membrane 303. Referring to FIGS. 8a and 9, a pit 802 on the air damping piece 206 is shaped to receive the thereby preventing the screw 305a from rotating with respect to the air damping piece 206. In this embodiment, the shape of the screw 305a and the pit 802 is regular hexagon. However, the top of the screw element may be any suitable shape that prevents rotation with respect to the air damping piece including, but not limited to, hexagonal (as shown), triangular, square, rectangular, octagonal, pentagonal, and elliptical.

Figure 10:
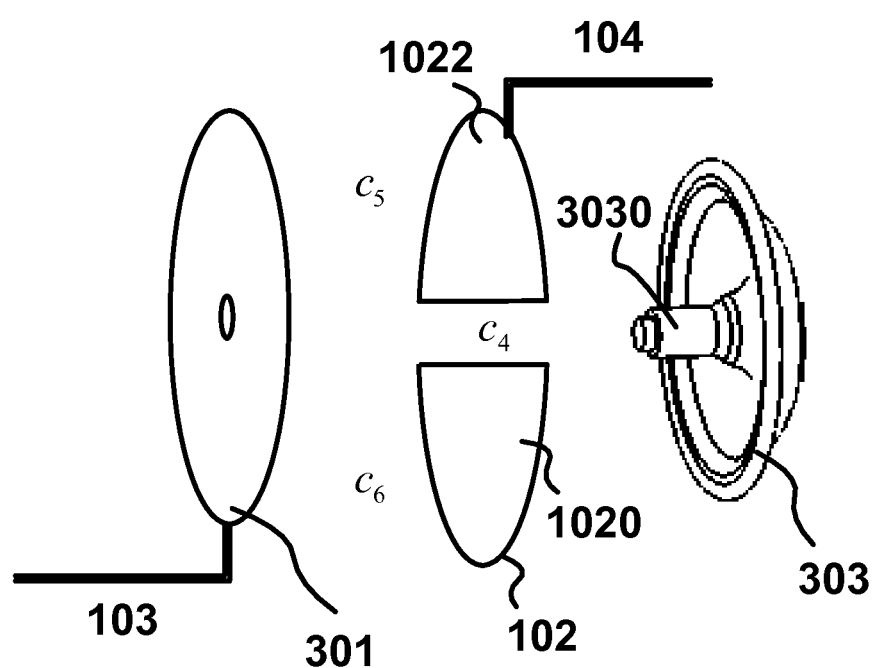
FIG. 10 is an expanded view of a capacitor sensor.

FIG. 10 is an expanded view of a capacitor sensor according to other embodiments. Such a capacitor sensor has a second conductive plate 102, which comprises a first conductive surface 1020 and a second conductive surface 1022 placed side by side. The central protrusion 3030 of the pressure sensitive membrane extends through a space between the first and second conductive surfaces 1020 and 1022 to connect to the first conductive plate 301. An inherent capacitor, which is similar to the first capacitor described above, has a capacitance $c_4$ and is formed between the first and second conductive surfaces 1020 and 1022. A second capacitor with a capacitance $c_5$ is formed by the first conductive plate 301 and the first conductive surface 1020, and a third capacitor with a capacitance $c_6$ is formed by the first conductive plate 301 and the second conductive surface 1022. In another embodiment, the first and second conductive surfaces 1020 and 1022 are wired by wires 103 and 104, respectively, to provide the output of the capacitor sensor. In addition to the semi-circles shown in FIG. 10, the first and second conductive surfaces 1020 and 1022 can take other shapes, such as semi-rings. Further, the first and second conductive surfaces 1020 and 1022 may be mounted on a base, similar to the embodiment described in FIG. 5a-5b.

If the first conductive plate 301 is angled or tilted in relation to the second conductive plate 302, which includes a first conductive surface 1020 and a second conductive surface 1022 placed side by side, (FIG. 10), one of $c_5$ and $c_6$ is increased and the other is decreased. In contrast, if the first conductive plate 301 is angled or tilted in relation to the second conductive plate 302 which includes a first conductive surface 3021 surrounded by a second conductive surface 3022 (FIG. 6), in the embodiment shown in FIGS. 3a-3c, both $c_2$ and $c_3$ increase or decrease equally or substantially equally because the surface area that contributes to each capacitance ($c_2$ and $c_3$) is the same or substantially the same on either side of the tilted plate 301. Therefore, as compared to the embodiment described in FIG. 10, the embodiment described in FIGS. 3a-3c is less sensitive to tilting of the first conductive plate 301, increasing the accuracy of the capacitance change.

Figure 11:
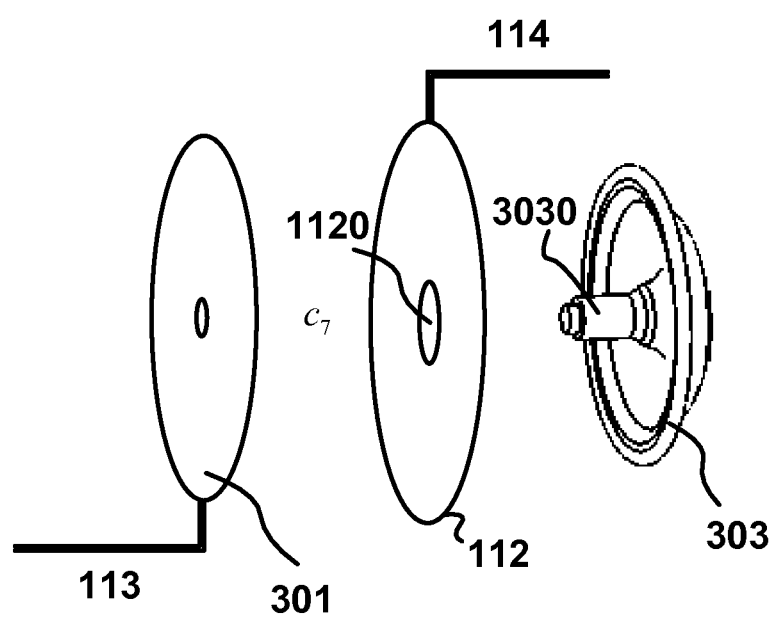
FIG. 11 is an expanded view of a capacitor sensor.

FIG. 11 is a cross sectional view of a capacitor sensor according to another embodiment. In this embodiment, the second conductive plate 112 has a single conductive surface having a hole 1120. The central protrusion 3030 of the pressure sensitive membrane 303 extends through the hole 1120 to make contact with the first conductive plate 301. A capacitor with a capacitance $c_7$ is formed by the first conductive plate 301 and the second conductive plate 112 In this embodiment, first conductive plate 301 and the second conductive plate 112 are both wired by wires 113 and 114, respectively, to provide the output signal of the capacitor sensor.

Capacitor sensors according to the embodiments described herein are robust against liquid leakage, moisture, dust or other negative factors that can increase the chance of failure of capacitor sensors of the art. For example, if nicotine solution that is stored in an electronic smoking device leaks into the capacitor circuit 40, the capacitor circuit 40 will continue to work. Liquid leakage may change the inherent capacitance of the circuit 40, but the circuit 40 may continue to provide detectable changes in capacitance (i.e., Δc). In addition, the capacitor sensors described herein do not require polarized components such as the permanently charged membrane described in the background, hence liquid leakage and/or dust may not cause a fault in the capacitor sensors by short circuit.

In an alternative embodiment, the output of a capacitor sensor may be changed by adjusting the surface area where the first conductive plate and the second conductive plate overlap with each other instead of adjusting the distance between the first and second assemblies. For example, referring to FIG. 11, the central protrusion 3030 may be coupled to the first conductive plate 301 by, for example, a pulley (not shown) which converts an axial movement of the central protrusion 3030 to a radial movement of the first conductive plate 301. Therefore, the surface area where the first conductive plate 301 and the second conductive plate 112 overlap with each other will be changed when a user inhales. The output signal of the capacitor sensor changes accordingly and may be detected by the control unit 14. In another aspect, the pulley may be displaced by a gear assembly.

In another embodiment, the changes of area can be carried out by converting the axial movement of the central protrusion 3030 to a rotation of the first conductive plate 301 by, for example, a gear assembly or a pulley.

In another embodiment, a first conductive plate driven by the pressure sensitive component may include first and second conductive surfaces. By moving the first and second conductive surfaces with respect to a second conductive plate, an output of the capacitor sensor may be changed and detected by the control unit 14.

Figure 12:
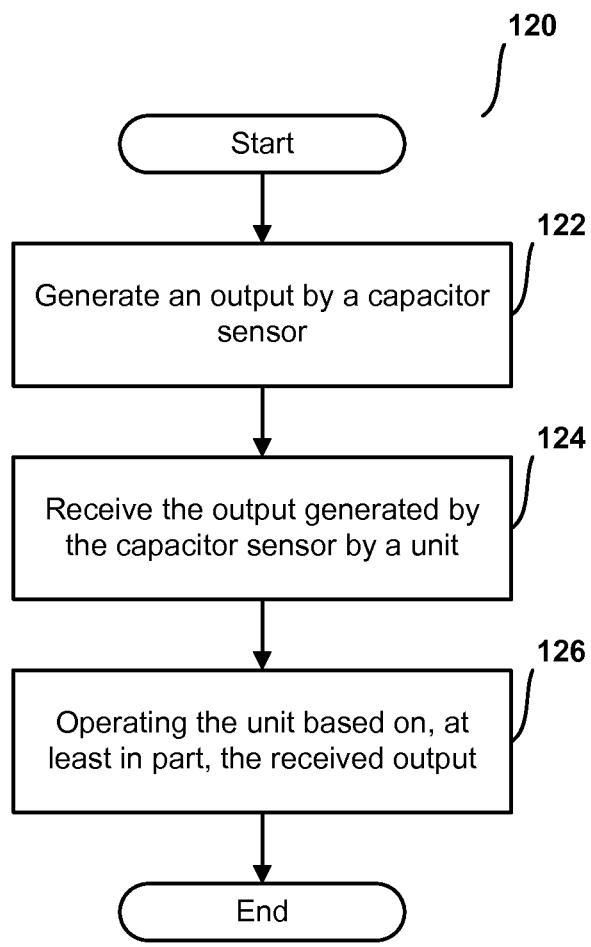
FIG. 12 is a flow chart of a method for operating an electronic device.

FIG. 12 is a flow chart that illustrates a method 120 for operating an electronic device that uses a capacitor sensor according to an embodiment of the invention.

At block 122, an output signal is generated by a capacitor sensor, as described above and illustrated by the capacitor sensor 20 in FIG. 1. At block 124, a control unit coupled to the capacitor sensor receives the output. In one embodiment, the electronic device is an electronic smoking device such as an electronic cigarette, which includes an atomizer 12, a control unit 14 and a power supply 16 as shown in FIG. 1. At block 126, the control unit is operated based on, at least in part, the received output of the capacitor sensor. In an embodiment, the control unit 14 detects a change in capacitance based on the output of the capacitor sensor 20 and controls the atomization performed by the atomizer 12.

In another embodiment, at block 126, the electronic device may be a microphone and the control unit controls a gain at an amplifier so as to control a sound volume based on the change in capacitance resulting from a sonic wave. If the user speaks or sings loudly, a membrane in the microphone will vibrate greatly, which results in a larger change in the capacitance. On the other hand, if the user speaks or sings softly, the membrane will vibrate slightly, which results in a smaller change in the capacitance.

Unless the context clearly requires otherwise, throughout the description and the claims, the words "comprise," "having," "include," and the like, and conjugates thereof, are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using singular or plural reference may also include plural or singular reference, respectively. The word "or," in reference to a list of two or more items, covers all of the following interpretations of the word: any of the items in the list, all of the items in the list, and any combination of the items in the list. The term "based on" is not exclusive and is equivalent to the term "based, at least in part, on" and includes being based on additional factors, whether or not the additional factors are described herein. The term "move" covers axial movement, radial movement, rotation or any combination thereof.

The above Detailed Description of embodiments of the system is not intended to be exhaustive or to limit the device to the precise form disclosed above. While specific embodiments of, and examples for, the cigarette or cartridge are described above for illustrative purposes, various equivalent modifications are possible within the scope of the system, as those skilled in the relevant art will recognize. Further, any specific numbers noted herein are only examples. Alternative embodiments and implementations may employ differing values or ranges.

The invention claimed is:

1. An electronic smoking device, comprising:
a control unit electrically connected to a power supply, a pressure sensor and to an atomizer, with the control unit activating the atomizer in response to a signal from the pressure sensor;
the electronic smoking device including one or more air inlets and an outlet;
an air damping piece having an air damping channel and a through hole,
wherein during inhalation on the electronic smoking device, air is drawn through the through hole and a negative pressure is generated in a cavity, and an inflow of air flows into the electronic smoking device via the one or more air inlets, with the inflow of air into the cavity delayed by the air damping channel, causing the atomizer to remain switched on for a time interval which varies based on a depth of the inhalation;
wherein the air damping channel is formed on a first side of the air damping piece, and with the through hole extending through the air damping piece from the first side to a second side of the air damping piece.

2. The electronic smoking device of claim 1 wherein the air damping channel curves through an arc greater than 180°.

3. The electronic smoking device of claim 1 with the air damping piece comprising a disk, and with the through hole on a central axis of the air damping piece, and with the air damping channel extending around the through hole.

4. The electronic smoking device of claim 1 wherein the air damping channel includes an outer circumferential channel around an inner circumferential channel coaxial with the through hole.

5. The electronic smoking device of claim 4 with the air damping piece having a cylindrical outer sidewall and a radial channel inlet through the cylindrical sidewall leading into the air damping channel.

6. The electronic smoking device of claim 1 with the cavity on a first side of the air damping piece, and with the air damping channel on a second side of the air damping piece opposite from the first side, and wherein the first side is a negative pressure side.

7. The electronic smoking device of claim 1 wherein the pressure sensor comprises a membrane and the cavity is between the membrane and the air damping piece.

8. The electronic smoking device of claim 1 with the air damping channel covered by a flat surface of a connection piece.

9. The electronic smoking device of claim 7 wherein the pressure sensor is adapted to convert a pressure differential formed in the cavity due to inhalation into an electronic signal.

10. An electronic device, comprising:
- a control unit electrically connected to a power supply, a pressure sensitive component and to an atomizer, with the control unit activating the atomizer in response to a signal from the pressure sensitive component;
- the electronic device including one or more air inlets and an outlet;
- a disk having an air damping channel on a first side of the disk, and a through hole extending through the disk from the first side to a second side of the disk, with an inflow of air through the one or more air inlets flowing to a first end of the air damping channel during user inhalation on the outlet, and with a second end of the air damping channel connecting into a cavity, and with inflow of air into the cavity delayed by the air damping channel;
- wherein the control unit is configured to provide electrical current to the atomizer based on an output signal from the pressure sensitive component; and
- the cavity is between the pressure sensitive component and the disk.

11. The electronic device of claim 10 with the through hole on a central axis of the disk, and with the air damping channel extending around the through hole.

12. The electronic device of claim 10 wherein the air damping channel includes an outer circumferential channel around an inner circumferential channel.

13. The electronic device of claim 10 with the disk having a radial channel inlet through a cylindrical sidewall of the disk, with the radial channel inlet leading into the air damping channel.

14. The electronic device of claim 10 with the cavity on a first side of the disk, and with the air damping channel on a second side of the disk opposite from the first side.

15. The electronic device of claim 10 having a single air damping channel and with all air flowing from the one or more air inlets to the outlet passing through the single air damping channel.

16. The electronic device of claim 10 further including a connection piece having a flat surface overlying and enclosing the air damping channel.

17. The electronic device of claim 10 further including a screw attached to the disk, with a passageway in the screw leading into the cavity.

18. An electronic vaporizing device, comprising:
- a control unit electrically connected to a power supply, a pressure sensor and to an atomizer in a housing, with the control unit activating the atomizer in response to a signal from the pressure sensor;
- one or more air inlets and an outlet in the housing;
- an air damping piece in the housing having an air damping channel and a hole extending through the air damping piece, the air damping channel having at least one outer circumferential channel segment and at least one inner circumferential channel segment surrounded by the at least one outer circumferential channel segment;
- wherein during inhalation, a negative pressure is generated in a cavity in the housing and air flow into the cavity is delayed by the air damping channel, causing the atomizer to remain switched on for a time interval based on a depth of the inhalation.

* * * * *